United States Patent
McAdam

(10) Patent No.: US 8,314,713 B2
(45) Date of Patent: Nov. 20, 2012

(54) METHOD FOR MONITORING THE OPERATION OF A METAL DETECTION SYSTEM AND METAL DETECTION SYSTEM

(75) Inventor: Stephen McAdam, Warrington (GB)

(73) Assignee: Mettler-Toledo Safeline Limited, Manchester (GB)

(*) Notice: Subject to any disclaimer, the term of this patent is extended or adjusted under 35 U.S.C. 154(b) by 0 days.

(21) Appl. No.: 13/239,193

(22) Filed: Sep. 21, 2011

(65) Prior Publication Data
US 2012/0098667 A1   Apr. 26, 2012

(30) Foreign Application Priority Data
Oct. 7, 2010 (EP) ..................... 10186894

(51) Int. Cl.
G08B 29/00 (2006.01)
G08B 21/00 (2006.01)
G08B 13/08 (2006.01)
G08B 13/24 (2006.01)
G08B 13/14 (2006.01)
G01N 27/72 (2006.01)
G01N 27/82 (2006.01)
G01R 33/12 (2006.01)

(52) U.S. Cl. ........ 340/635; 340/506; 340/540; 340/547; 340/551; 340/686.1; 324/233; 324/241; 324/235

(58) Field of Classification Search ............... 340/686.1, 340/635, 540, 547, 551; 324/233, 235
See application file for complete search history.

(56) References Cited

U.S. PATENT DOCUMENTS
2,598,252 A   5/1952   Gossick
(Continued)

FOREIGN PATENT DOCUMENTS
DE   3406736 A1   8/1985
(Continued)

OTHER PUBLICATIONS

Abbas, H.J. et al, The detection and location of foreign metal objects in conveyed products, Trans Inst M C., Apr.-Jun. 1986, pp. 76-84, 8(2).

(Continued)

Primary Examiner — Daniel Wu
Assistant Examiner — Muhammad Adnan
(74) Attorney, Agent, or Firm — Standley Law Group LLP

(57) ABSTRACT

A method for monitoring the operation of a metal detection system that comprises a balanced coil system with a transmitter coil that is connected to a transmitter unit, which provides transmitter signals having a fixed or variable transmitter frequency, and with a first and a second receiver coil that provide output signals to a receiver unit. A system adapted to operate according to an exemplary method is also provided. According to one embodiment, a carrier signal having the transmitter frequency and a monitoring signal having a monitoring frequency are provided to a modulation unit that suppresses the carrier signal and provides a modulated monitoring signal, which is supplied to a monitoring coil that is inductively coupled with at least one of the receiver coils, whose output signals are demodulated in a demodulation unit that provides a demodulated monitoring signal, which is compared in phase and/or in amplitude with a reference.

20 Claims, 2 Drawing Sheets

U.S. PATENT DOCUMENTS

| | | | | |
|---|---|---|---|---|
| 2,815,699 | A | * | 12/1957 | Davis .......................... 89/33.25 |
| 3,075,145 | A | * | 1/1963 | Goldberg et al. ............ 324/233 |
| 3,617,866 | A | | 11/1971 | Dowsett et al. |
| 3,686,564 | A | * | 8/1972 | Mallick et al. ................ 324/232 |
| 3,721,821 | A | | 3/1973 | Blanyer |
| 3,758,849 | A | | 9/1973 | Susman et al. |
| 3,896,608 | A | | 7/1975 | Garrott |
| 4,176,555 | A | | 12/1979 | Dorman |
| 4,263,551 | A | | 4/1981 | Gregory et al. |
| 4,300,097 | A | | 11/1981 | Turner |
| 4,451,812 | A | | 5/1984 | Vescovi et al. |
| 4,563,644 | A | | 1/1986 | Lenander et al. |
| 4,563,645 | A | * | 1/1986 | Kerr .............................. 324/233 |
| 4,800,477 | A | | 1/1989 | Esposito |
| 4,837,511 | A | | 6/1989 | Whittington et al. |
| 4,843,324 | A | | 6/1989 | Humphreys, Jr. et al. |
| 4,965,522 | A | | 10/1990 | Hazen et al. |
| 5,003,271 | A | | 3/1991 | Swanson |
| 5,034,689 | A | | 7/1991 | Inoue et al. |
| 5,068,612 | A | | 11/1991 | Auslander et al. |
| 5,189,366 | A | * | 2/1993 | Mayo ............................ 324/233 |
| 5,264,733 | A | | 11/1993 | Tigges |
| 5,304,927 | A | | 4/1994 | Thomas et al. |
| 5,345,160 | A | | 9/1994 | Corniere |
| 5,386,182 | A | | 1/1995 | Nikami |
| 5,572,121 | A | | 11/1996 | Beswick |
| 5,642,050 | A | | 6/1997 | Shoemaker |
| 5,650,726 | A | | 7/1997 | Gasnier et al. |
| 5,691,640 | A | * | 11/1997 | King ............................. 324/233 |
| 5,729,143 | A | | 3/1998 | Tavernetti et al. |
| RE35,806 | E | | 5/1998 | Rossi et al. |
| 5,859,533 | A | | 1/1999 | Gasnier et al. |
| 5,929,634 | A | | 7/1999 | Artinger |
| 5,969,528 | A | | 10/1999 | Weaver |
| 5,973,595 | A | * | 10/1999 | Scrivner et al. ............... 340/551 |
| 5,994,897 | A | | 11/1999 | King |
| 6,037,870 | A | | 3/2000 | Alessandro |
| 6,064,315 | A | * | 5/2000 | Orlassino et al. ........... 340/686.1 |
| 6,094,079 | A | | 7/2000 | Boggs et al. |
| 6,118,337 | A | | 9/2000 | Schweighofer |
| 6,130,489 | A | | 10/2000 | Heimlicher |
| 6,157,190 | A | | 12/2000 | Nagaishi et al. |
| 6,177,792 | B1 | | 1/2001 | Govari et al. |
| 6,236,200 | B1 | | 5/2001 | Nekado et al. |
| 6,337,566 | B1 | | 1/2002 | Fujisaki et al. |
| 6,420,866 | B1 | | 7/2002 | Goldberg et al. |
| 6,437,573 | B1 | | 8/2002 | Golder et al. |
| 6,724,191 | B1 | | 4/2004 | Larsen |
| 6,958,603 | B2 | | 10/2005 | Kondo |
| 7,102,347 | B2 | | 9/2006 | Kondo |
| 7,663,361 | B2 | | 2/2010 | Nishio et al. |
| 7,665,664 | B2 | * | 2/2010 | Charrat et al. ................ 235/451 |
| 7,693,487 | B2 | * | 4/2010 | Nakagawa ................... 455/41.3 |
| 8,207,731 | B2 | * | 6/2012 | Moskalenko ................. 324/233 |
| 2002/0093338 | A1 | | 7/2002 | Rowan |
| 2003/0117270 | A1 | | 6/2003 | Dimmer et al. |
| 2003/0141866 | A1 | | 7/2003 | Johnson et al. |
| 2003/0164766 | A1 | | 9/2003 | Britton |
| 2004/0046550 | A1 | | 3/2004 | Kondo |
| 2004/0155651 | A1 | * | 8/2004 | Britton ......................... 324/243 |
| 2005/0104594 | A1 | | 5/2005 | Nelson et al. |
| 2006/0006872 | A1 | | 1/2006 | Nelson |
| 2006/0226833 | A1 | * | 10/2006 | Kubotera et al. ............. 324/236 |

FOREIGN PATENT DOCUMENTS

| | | | |
|---|---|---|---|
| DE | 3713363 | A1 | 11/1988 |
| DE | 4424058 | C1 | 10/1995 |
| DE | 202004011073 | U1 | 11/2004 |
| EP | 0124042 | A2 | 11/1984 |
| EP | 0215244 | A2 | 3/1987 |
| EP | 0281014 | A2 | 9/1988 |
| EP | 0368762 | A2 | 5/1990 |
| EP | 0369954 | A1 | 5/1990 |
| EP | 0379804 | A2 | 8/1990 |
| EP | 0780704 | A2 | 6/1997 |
| EP | 0782012 | A2 | 7/1997 |
| EP | 1202077 | A2 | 5/2002 |
| EP | 1502544 | A1 | 2/2005 |
| GB | 400041 | | 1/1933 |
| GB | 528568 | | 2/1939 |
| GB | 677773 | | 8/1952 |
| GB | 776163 | | 6/1957 |
| GB | 819893 | | 9/1959 |
| GB | 1436900 | | 5/1976 |
| GB | 2004069 | A | 3/1979 |
| GB | 2025630 | A | 1/1980 |
| GB | 2026169 | A | 1/1980 |
| GB | 1603578 | | 11/1981 |
| GB | 2204133 | A | 11/1988 |
| GB | 2372329 | A | 8/2002 |
| GB | 2423366 | A | 8/2006 |
| GB | 2462212 | A | 2/2010 |
| JP | 53-142260 | A | 12/1978 |
| JP | 57-133373 | A | 8/1982 |
| JP | 57-187649 | A | 11/1982 |
| JP | 57-187650 | A | 11/1982 |
| JP | 59-40287 | A | 3/1984 |
| JP | 59-48673 | A | 3/1984 |
| JP | 59-60274 | A | 4/1984 |
| JP | 59-60277 | A | 4/1984 |
| JP | 60-178318 | A | 9/1985 |
| JP | 60-225084 | A | 11/1985 |
| JP | 1-176972 | A | 7/1989 |
| JP | 3-218490 | A | 9/1991 |
| JP | 9-80162 | A | 3/1997 |
| JP | 10-111363 | A | 4/1998 |
| JP | 11-337656 | A | 12/1999 |
| JP | 2000-56032 | A | 2/2000 |
| JP | 2001-91661 | A | 4/2001 |
| JP | 2001-91663 | A | 4/2001 |
| JP | 2002-168965 | A | 6/2002 |
| JP | 2002-333485 | A | 11/2002 |
| JP | 2004-205319 | A | 7/2004 |
| JP | 2004-251712 | A | 9/2004 |
| WO | 87/04801 | A1 | 8/1987 |
| WO | 88/03273 | A1 | 5/1988 |
| WO | 97/36143 | A1 | 10/1997 |
| WO | 02/25318 | A1 | 3/2002 |
| WO | 2006/087510 | A1 | 8/2006 |
| WO | 2008/006178 | A1 | 1/2008 |

OTHER PUBLICATIONS

Asakawa, K. et al, Metal Detector for Tracing Submarine Telecommunication Cables, IEEE Transactions on Instrumentation and Measurement, Dec. 1983, pp. 477-483, IM-32(4).

Dairy Foods, Buyers Mart: Plant Equipment, web pages from www.dairyfoods.com, 2010, 6 pages, BNP Media.

Brown, J., Brief H-Bridge Theory of Operation, Tutorials, 2011, 4 pages, Dallas Personal Robotics Group.

CEIA, Industrial Metal Detector THS, Oct. 31, 2000, 96 pages, CEIA S.p.A., Italy.

CEIA, Industrial Metal Detector THS, Dec. 5, 2001, 97 pages, CEIA S.p.A., Italy.

CEIA, Industrial Metal Detector, Apr. 2002, 40 pages, CEIS S.p.A., Italy.

Cintex Ltd., Foodex Meatex 2004, Entrepreneur Food Trade Review, Feb. 2004, 2 pages, Food Trade Press Ltd. and Gale Group.

Dairy Field, Variable-frequency metal detector, web pages from www.allbusiness.com, Jan. 1, 2005, 2 pages, AllBusiness.com, Inc.

Flind, A., Magnum Metal Locator, Practical Electronics, 1980, pp. 1-11, Wimborne Publishing.

Flind, A., Magnum Metal Locator Part 3, Practical Electronics, 1981, pp. 1-22, Wimbourne Publishing.

Funkschau, Metallsuchgerate, Funkschau, Jul. 10, 1981, pp. 50-54, 14.

Gray, J., Development of an advanced industrial metal detector instrumentation, Computing & Control Engineering Journal, Jun. 1994, pp. 117-120, 5(3).

Hamo, D.J., A 50W, 500kHz, Full-Bridge, Phase-Shift, ZVS Isolated DC to DC Converter Using the HIP4081A, Intersil Intelligent Power, Apr. 1995, pp. 1-16, AN9506.

Loma Systems, Inc., Loma Launches Cintex Brand Sentry VF, First-Ever, Variable Frequency Metal Detector, web page from www.beverageonline.com, Nov. 16, 2004, 1 page, VertMarkets, Inc.

Nelson, C.V. et al., Wide Bandwidth Time-Domain Electromagnetic Sensor for Metal Target Classification, IEEE Transactions on Geoscience and Remote Sensing, Jun. 2001, pp. 1129-1138, 39(6).

Heat and Control, CEIA THS/3F Metal Detector Product Information Sheet, web page from www.heatandcontrol.com, 2006, 1 page, Heat and Control, Inc.

Heat and Control, THS/3F Multi-frequency metal detector for quality control, 2 pages.

Wattagnet.com, Mettler-Toledo Safeline Profile metal detection systems, web pages from www.wattagnet.com, printed Feb. 23, 2011, 2 pages.

Packworld.com, Cintex Sentry VF variable frequency metal detector, web page from www.packworld.com, Nov. 2004, 1 page.

Brand protection looks to Tailored solutions from inspection systems, Machinery Update, Mar./Apr. 2004, pp. 85-90.

Kittel, C.F. et al., Metal Detector, U.S. Appl. No. 11/883,950, international filing date Jan. 9, 2006, 49 pages.

* cited by examiner

METHOD FOR MONITORING THE
OPERATION OF A METAL DETECTION
SYSTEM AND METAL DETECTION SYSTEM

This application claims priority under 35 U.S.C. §119 to European Patent Application No. 10186894.1, filed Oct. 7, 2010, which is hereby incorporated by reference in its entirety.

BACKGROUND AND SUMMARY OF THE INVENTION

Exemplary embodiments of the present invention relate generally to a method for monitoring the operation of a metal detection system and to a metal detection system that implements this method.

An industrial metal detection system is used to detect and reject unwanted metal contamination. When properly installed and operated, it will help reduce metal contamination and improve food safety. Most modern metal detectors utilize a search head comprising a "balanced coil system." Detectors of this design may be capable of detecting metal contaminant types including ferrous, nonferrous, and stainless steels in a large variety of products such as fresh and frozen products.

A metal detection system that operates according to the "balanced coil"-principle typically comprises three coils that are wound onto a non-metallic frame, each exactly parallel with the other. The transmitter coil located in the center is energized with a high frequency electric current that generates a magnetic field. The two coils on each side of the transmitter coil act as receiver coils. Since the two receiver coils are identical and installed the same distance from the transmitter coil, an identical voltage is induced in each of them. In order to receive an output signal that is zero when the system is in balance, the receiver coils are connected in series with the second receiver coil having an inverse winding. Hence the voltages induced in the receiver coils, that are of identical amplitude and inverse polarity, cancel out one another in the event that the system, in the absence of metallic contaminations, is in balance.

As a particle of metal passes through the coil arrangement, the high frequency field is disturbed first near one receiver coil and then near the other receiver coil. While the particle of metal is conveyed through the receiver coils the voltage induced in each receiver coil is changed (by nano-volts). This change in balance results in a signal at the output of the receiver coils that can be processed, amplified and subsequently be used to detect the presence of metal contamination.

The signal processing channels split the received signal into two separate components that are 90° apart from one another. The resultant vector has a magnitude and a phase angle, which is typical for the products and the contaminants that are conveyed through the coils. In order to identify a metal contaminant, "product effects" need to be removed or reduced. Knowing the phase of the product, the corresponding signal vector can be reduced. Eliminating unwanted signals from the signal spectrum thus leads to higher sensitivity for signals originating from contaminants.

In order to obtain information about the sort and volume of the contaminants and in order to at least partially eliminate unwanted signals caused by "product effects" or disturbances such as vibrations, it is important that the system processes accurate signal amplitude and signal phase for the measured signals.

In the event that system deficiencies occur that degrade signal amplitude or signal phase, the measured results, which reflect the quality of the production process, are no longer reliable. For instance, the system may not raise an alarm if a contamination is present (false negative). Alternatively the system may raise an alarm if a contamination is not present (false positive).

Traditional methods, that verify that the metal detection system is correctly set up, do not allow detecting such system deficiencies.

Exemplary embodiments of the present invention are therefore based on providing an improved method for monitoring the operation of a metal detection system as well as on providing a metal detection system operating according to this method.

Particularly, exemplary embodiments of the present invention are based on providing a method that allows detecting malfunctions that would prevent the metal detection system from correctly detecting product contaminations.

More particularly, exemplary embodiments of the present invention are based on providing a method that allows avoiding false positive and false negative readings by the metal detection system.

The above and other advantages of exemplary embodiments of the present invention are achieved by an improved method for monitoring the operation of a metal detection system and a metal detection system operating according to this method.

An exemplary embodiment of the method serves for operating a metal detection system that comprises a balanced coil system with a transmitter coil that is connected to a transmitter unit, which provides transmitter signals having a fixed or variable transmitter frequency and with a first and a second receiver coil that provide output signals to a receiver unit. The coil system is designed and arranged in such a way that the output signals compensate one another in the event that the metal detection system is in balance.

According to an exemplary embodiment of the invention, a carrier signal having the transmitter frequency and a monitoring signal having a monitoring frequency are provided to a modulation unit that suppresses the carrier signal and provides a modulated monitoring signal, which is supplied to a monitoring coil that is inductively coupled with at least one of the receiver coils. The output signals of the receiver coils are further processed and demodulated in a demodulation unit that provides at least a demodulated monitoring signal, which is compared in phase and/or in amplitude with a reference, such as the phase and/or amplitude of the monitoring signal. In the event that the measured deviations in phase or in amplitude exceed a given threshold an alarm is raised indicating that a malfunction of the metal detection system has occurred.

An exemplary embodiment of the method allows for measurement of the performance of the metal detection system and verification if the measured performance lies within the specifications. It may be checked whether the transmitter part and the receiver part of the system operate correctly. Further, it can be checked whether other disturbances, such as influences from the installation site, e.g. vibrations or magnetic fields, have a negative impact on the metal detection system and the measurement process.

While the exemplary process of measuring the performance of the metal detection system may be intrusive and thus very reliable, any disturbing impact of this process on the measurement process is avoided. For this purpose the signals introduced into the balanced coil system may be selected in such a way that no interference with the measurement process occurs. The monitoring frequency may be selected to be above the frequency range of the product signals that are induced into the balanced coil system by objects measured during the operation of the metal detection system.

A decoupling of the monitoring signal from the measurement process may also be achieved by the placement and installation of the monitoring coil, which is preferably wound around a tail of one of the receiver coils that is attached to the receiver board. A possible remaining influence of the monitoring signal may be eliminated with the final calibration of the metal detection system. On the other hand, an exemplary measurement process may also not disturb the monitoring process since the measured products will not travel through the monitoring coil.

An example of the monitoring frequency is selected in the range of 50 Hz to 1000 Hz, preferably in the range between 500 Hz and 700 Hz. For example, a frequency of 615 Hz may be selected. Preferably, the monitoring frequency and the transmitter frequency are selected in such a way that the transmitter frequency, which may change during operation, is an even numbered multiple of the monitoring frequency. In this embodiment, the whole system may operate phase coherent allowing additional testing for phase coherence in the signal processing unit. The monitoring frequency may be derived from a reference unit that provides a reference frequency, which may be forwarded via a divider unit to a first input of the modulation unit. The divider unit may divide the reference frequency by an even number in order to obtain the monitoring frequency.

In a first basic embodiment, the carrier signal that is supplied to a first input of the modulation unit is derived from the output of a power amplifier that supplies the transmitter signal to the transmitter coil. In a second basic embodiment, the carrier signal is derived from a signal source, such as a frequency synthesizer, that provides reference frequencies to the power amplifier. The signal source may provide the transmitter frequency or a multiple thereof, which may be forwarded to another divider unit that provides the transmitter frequency, preferably including the in-phase and quadrature components. Deriving the frequency of the carrier signal and/or the frequency of the monitoring signal from the earliest stage of the system may allow for checking the system from the front end to the back end.

In an exemplary embodiment, since the carrier signal and the transmitter signal have the same frequency, the modulated monitoring frequency has a constant frequency offset to the transmitter frequency. This constant frequency offset corresponds to the monitoring frequency.

The monitoring process may therefore not be interrupted in the event that the transmitter frequency has been changed, e.g., because a frequency value has been found that is more favorable for the current measurement process.

For the process of obtaining a carrierless monitoring signal, the principles of double sideband modulation and single sideband modulation may be applied. For demodulation purposes, the carrier that is suppressed in the modulated monitoring signal may always be available from the transmitter unit.

In an exemplary embodiment, the modulation unit is a Single Sideband Modulator which provides terms for one sideband and terms for the carrier signal that are canceled due to their phase angle. For the remaining sideband, terms are provided that are in-phase. As a result, a single sideband with a frequency that is offset by the monitoring frequency from the transmitter frequency is supplied to the monitoring coil.

In an exemplary embodiment, the receiver coils are connected with one tail to one another and with the other tail to the respective tails of two identical center-tapped primary windings of a balanced transformer. The balanced transformer has two identical center-tapped secondary windings, whose opposite tails are connected to an amplifier. The amplifier forwards an amplified signal, preferably via a filter unit, to the demodulation unit, which provides in-phase components and quadrature components of the demodulated monitoring signal and preferably also the baseband signal or product signal originating from the products measured with the metal detection system.

For this purpose, the in-phase components and quadrature components of a reference signal with the frequency of the carrier signal, e.g., the carrier signal, are provided to the reference inputs of the demodulation unit, which delivers the in-phase components and the quadrature components of the demodulated monitoring signal, which are further evaluated in order to detect deviations of the amplitudes or of the phase of the resultant vector. In an exemplary embodiment, the demodulation unit provides the in-phase components and the quadrature components of the product signal as well.

In an exemplary embodiment, the monitoring signal may be used as a reference to evaluate the demodulated monitoring signal. For this purpose the monitoring signal may be supplied directly from the transmitter stage to the receiver stage.

In an exemplary embodiment, the in-phase component and the quadrature component and/or the related phase angle of the demodulated monitoring signal are compared with corresponding values that may be measured and stored during final testing of the metal detection system. Further provided may be at least one threshold value that should not be exceeded by a measured phase or amplitude during normal operation of the metal detection system. However, in the event that a threshold is exceeded the signal processing unit may raise an alarm indicating a malfunction of the system.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
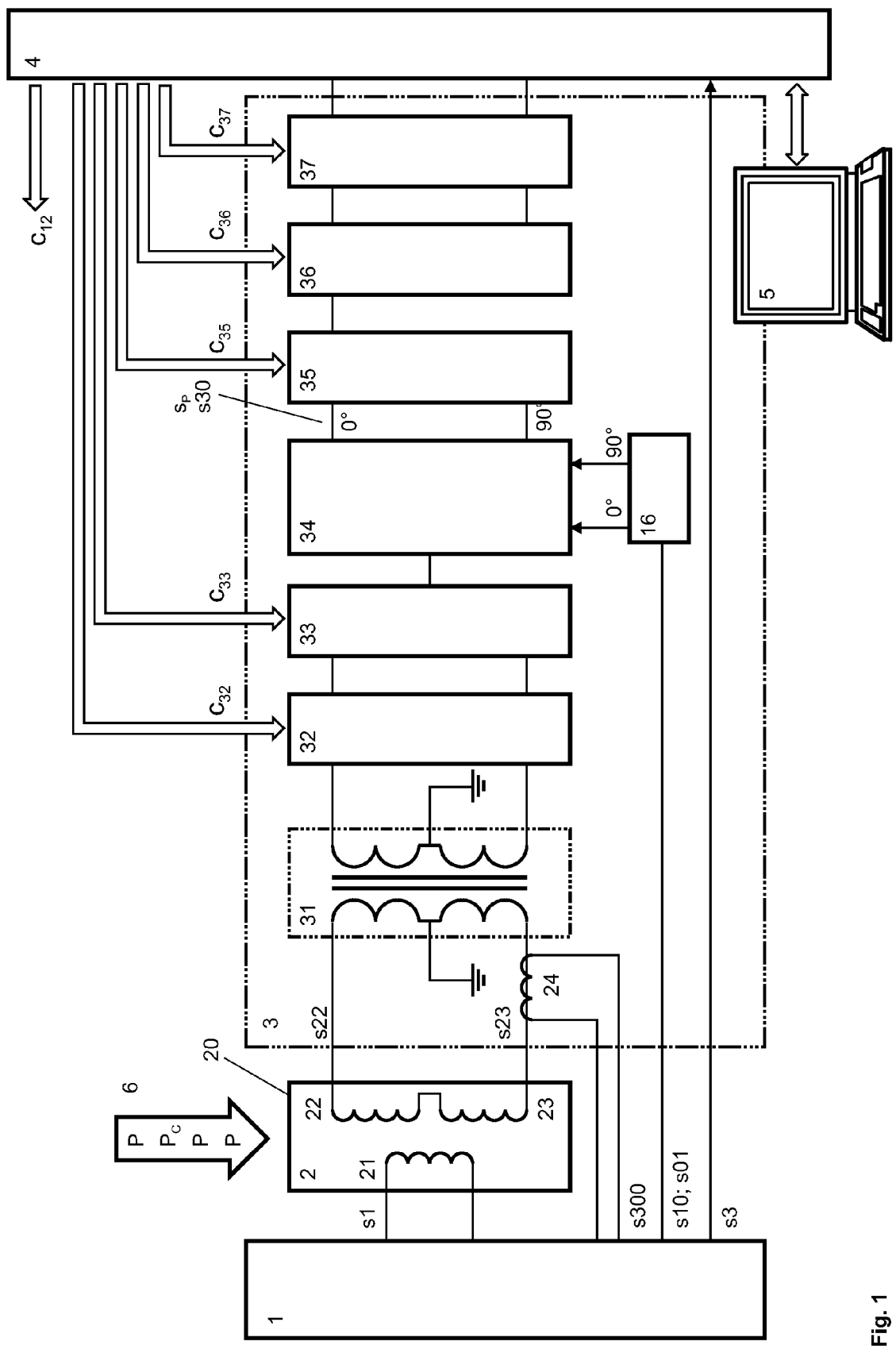
FIG. 1 shows a block diagram of an exemplary embodiment of a metal detection system.

FIG. 1 shows a block diagram of an exemplary metal detection system, which comprises: a transmitter unit 1; a balanced coil system 2 with a transmitter coil 21, a first and a second receiver coil 22, 23, and a monitoring coil 24; a receiver unit 3; a signal processing unit 4; and a computer system 5 that comprises standard interfaces, input devices, and output devices, particularly a monitor. FIG. 1 further shows a conveyor 6, on which products P are transferred through the transmitter coil 21 and the receiver coils 22, 23.

Figure 2:
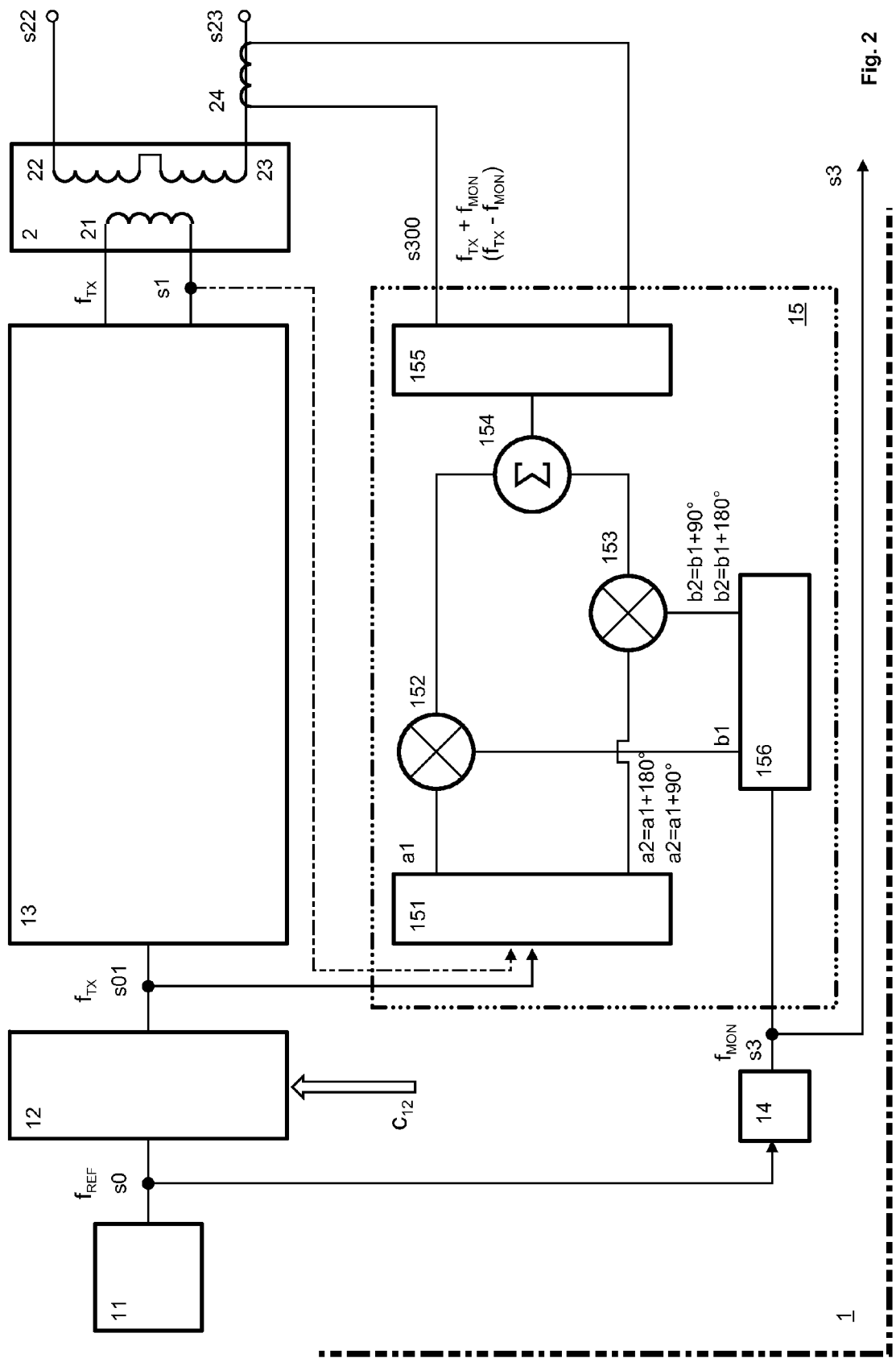
FIG. 2 shows a block diagram of an exemplary transmitter unit of the metal detection system shown in FIG. 1.

The transmitter unit 1, which will be discussed in detail with reference to FIG. 2, provides a transmitter signal s1 to the transmitter coil 21 of the balanced coil system 2 and a modulated monitoring signal s300 to the monitoring coil 24 of the balanced coil system 2. Further, the transmitter unit 1 provides a reference signal s10; s01 with the transmitter frequency $f_{TX}$ to the receiver unit 3. In addition a further signal s3, which relates to the monitoring signal s300 is preferably provided as a reference (see FIG. 2).

The transmitter signal s1 induces signals s22, s23 in the identical receiver coils 22, 23 that are of the same amplitude but inverse polarity as long as the system is in balance, i.e., as long as the conveyed products P are not contaminated with metals.

In the event that a product $P_C$ is contaminated with an electro-conductive object, then the signals s22, s23 in the identical receiver coils 22, 23 will change while the product $P_C$ passes through the balanced coil system 2. As a result, the transmitter frequency $f_{TX}$ induced in the receiver coils 22, 23 gets modulated with a baseband signal, whose amplitude and frequency are dependent on the property, dimension, and travelling speed of the electro-conductive object.

Since the electro-conductive object is not travelling through the monitoring coil 24, the magnetic field of the monitoring coil 24 is not disturbed. Interferences may further be avoided by placing the monitoring coil 24 outside of the frame 20, in which the transmitter coil 21 and the receiver coils 22, 23 are arranged. As shown in FIG. 1, the monitoring coil 24 is wound around the leg of the second receiver coil 23 that is connected to the receiver unit 3. Hence, products P do not travel through the monitoring coil 24.

The output signals s22, s23 of the receiver coils 22, 23 and the modulated monitoring signal s300, which has been induced into the receiver coils 22, 23, are applied to center-tapped primary windings of a balanced transformer 31, which mirror the receiver coils 22, 23. Further, the balanced transformer 31 comprises two identical center-tapped secondary windings whose opposite tails are connected to an amplifier 32. The outputs of the amplifier 32 are connected to a filter unit 33 which provides the amplified and filtered signals to a demodulation unit 34, which provides at its outputs the in-phase and quadrature components of the demodulated monitoring signal s30 and in-phase and quadrature components of the baseband signal $S_P$, which originates from the conveyed products P.

The in-phase and quadrature signals provided at the outputs of the demodulation unit 34 are forwarded to a further filter unit 35, which allows the desired signals to pass through to a gain unit 36 that allows setting the amplitudes of the processed signals to a desired value. Subsequently, the filtered and calibrated signals are converted in an analog to digital converter 37 from analog form to digital form. The output signals of the analog to digital converter 37 are forwarded to a signal processing unit, such as a known digital signal processor 4, which compares the demodulated and processed monitoring signals with reference values, e.g., with the phase and amplitude of the reference signal s3. The data resulting from the evaluation process is then forwarded to a data processing unit such as the central processing unit of the metal detection system or to a computer terminal 5 attached thereto. In the event that the demodulated signal differs from a given reference by more than a preset threshold, then an alarm may be raised.

In order to control the measurement process, the signal processor 4 may be capable of controlling the functions of various modules provided in the transmitter unit 1 and in the receiver unit 3. For this purpose, the signal processor 4 may forward a first control signal c32 to the amplifier unit 32, a second control signal c33 to the first filter unit 33, a third control signal c35 to the second filter unit 35, a fourth control signal c36 to the gain unit 36, and a fifth control signal c37 to the analog to digital converter 37. With these control signals c32, c33, c35, c36, and c37, the amplification and filter characteristics of the individual receiver units 32, 33, 35, 36, and 37 may be selected or adjusted. In this exemplary embodiment, a sixth control signal c12 is forwarded to the transmitter unit 1 as described below.

FIG. 2 shows a block diagram of the transmitter unit 1 of the metal detection system shown in FIG. 1.

The transmitter unit 1 comprises a reference unit 11 that provides a reference signal s0 with a reference frequency $f_{REF}$ to a signal source 12, such as a frequency synthesizer 12 that is controlled by the sixth control signal c12 received from the signal processor 4. The signal processor 4 may therefore select a suitable transmitter frequency $f_{TX}$ that is forwarded with signal S01 to a power amplifier 13, which may provide the amplified transmitter signal s1 to the transmitter coil 21 of the balanced coil system 2.

The reference signal s0 with the reference frequency $f_{REF}$ is further provided to a divider unit 14, which divides the reference frequency $f_{REF}$ by an even number thus obtaining the monitoring frequency $f_{MON}$ that is forwarded with signal s3 to a first input of a modulation unit 15. A carrier signal s1, S01 with the transmitter frequency $f_{TX}$ is provided from the output of the frequency synthesizer 12 or the output of the power amplifier 13 to the second input of the modulation unit 15.

In the modulation unit 15, the carrier signal s1, s01 is forwarded to a first quadrature unit 151 that provides the transmitter frequency $f_{TX}$ with a phase angle of a1 (e.g.,) 45° to a first input of a first mixing unit 152, and the transmitter frequency $f_{TX}$ with a phase angle of a2 (a2=a1+180° or a2=a1+90°) to a first input of a second mixing unit 153.

The monitoring signal s3 is forwarded to a second quadrature unit 156 that provides the monitoring frequency $f_{MON}$ with a phase angle of b1 (e.g., 0°) to a second input of the first mixing unit 152, and the monitoring frequency $f_{MON}$ with a phase angle of b2(b2=b1+180° or b2=b1+90°) to a second input of a second mixing unit 153.

The output signals of the first and the second mixing units 152, 153 are provided to a summing unit 154, in which the individual signals are combined with the result that the transmitter frequency terms, which are out of phase by 180°, are canceled.

If the angles b1 and b2 are out of phase by 180°, the modulator provides two sidebands. If the angles b1 and b2 are out of phase by 90°, the modulator provides only one sideband. Hence, depending on the phase angle selected, a single side band signal or a double side band signal, i.e., the modulated monitoring signal s300 with the frequency $f_{TX}+f_{MON}$ and/or the frequency $f_{TX}-f_{MON}$, is forwarded to an amplifier 155, whose output is connected to the monitoring coil 24, which is wound around one tail of the second receiving coil 23.

Hence, independently of the selected transmitter frequency $f_{TX}$, the modulated monitoring signal s300 is offset from the transmitter frequency $f_{TX}$ by the monitoring frequency $f_{MON}$. However, the carrier frequency, i.e., the transmitter frequency $f_{TX}$, remains suppressed and is not applied to the monitoring coil 24 and will therefore not disturb the measurement of the products P.

In the event that the carrier signal s01 is taken from the frequency synthesizer 12, then the evaluation of the demodulated monitoring signal s30 will provide information about the status of the power amplifier 13.

The carrier signal s1 or s01 as well as the monitoring signal s3 may be forwarded to the receiver unit 3 as reference signals for demodulation and evaluation purposes. Since all the signals are locked in phase, a change in phase or amplitude of the monitoring signal s3, which is detected by the signal processor 4, may indicate that either an external influence or a change within the electronic system has occurred. Such a change may be tolerated within predetermined boundaries for which threshold values may be pre-stored in the signal processing unit 4 or the computer terminal 5. In the event that the threshold values are exceeded, an exemplary embodiment of the monitoring system provided in the metal detection system may raise an alarm.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for monitoring the operation of a metal detection system that comprises a balanced coil system with a transmitter coil that is connected to a transmitter unit adapted to provide transmitter signals having one of a fixed transmitter frequency and a variable transmitter frequency and with a first receiver coil and a second receiver coil that are adapted to provide output signals to a receiver unit that are adapted to compensate one another in an event that the metal detection system is in balance, said method comprising:
    providing a carrier signal with the transmitter frequency and a monitoring signal with a monitoring frequency to a modulation unit that suppresses the carrier signal and provides a modulated monitoring signal;
    supplying the modulated monitoring signal to a monitoring coil that is inductively coupled with at least one of the receiver coils;
    demodulating output signals of the receiver coils in a demodulation unit that provides a demodulated monitoring signal to a signal processor; and
    comparing the demodulated monitoring signal in at least one of phase and amplitude with a reference and providing an alarm if a measured deviation exceeds a given threshold value.

2. The method of claim 1 wherein the monitoring frequency is selected above a frequency range of product signals that are induced into the balanced coil system by objects measured during operation of the metal detection system.

3. The method of claim 1 wherein a reference unit provides a reference frequency signal to a divider unit, which provides the monitoring signal with the monitoring frequency in the range between 50 Hz and 1000 Hz.

4. The method of claim 3 wherein the monitoring frequency is in the range between 500 Hz and 700 Hz.

5. The method of claim 1 wherein the carrier signal is derived from an output of a power amplifier that supplies the transmitter signal to the transmitter coil.

6. The method of claim 1 wherein the carrier signal is derived from a signal source that provides reference frequencies to a power amplifier.

7. The method of claim 1 wherein the modulation unit is one of:
    a Single Sideband Modulator that provides terms for one sideband and terms for the carrier signal that are canceled, such that one sideband is supplied to the monitoring coil; and
    a Double Sideband Modulator that provides terms for two sidebands and terms for the carrier signal that are canceled, such that two sidebands are supplied to the monitoring coil.

8. The method of claim 1 wherein the receiver coils are connected with one tail to one another and with another tail to respective tails of two identical center-tapped primary windings of a balanced transformer having two identical center-tapped secondary windings each having a tail that is connected to an amplifier;
    the amplifier forwards an amplified signal to the demodulation unit; and the demodulation unit, provides in-phase components and quadrature components of at least the demodulated monitoring signal.

9. The method of claim 8 wherein the amplified signal is forwarded by a filter unit to the demodulation unit.

10. The method of claim 8 wherein the in-phase component and at least one of the quadrature component and a related phase angle of the demodulated monitoring signal are compared to predetermined values for which at least the threshold value has been provided that should not be exceeded during normal operation of the metal detection system.

11. The method of claim 10 wherein at least one of the following are performed:
    an in-phase component and a quadrature component of the carrier signal are provided to the demodulation unit as a reference for demodulation purposes and for measuring the in-phase component and at least one of the quadrature component and the related phase angle of the demodulated monitoring signal; and
    the monitoring signal is used as a reference for measuring the deviation of the in-phase component and at least one of the quadrature component and the related phase angle of the demodulated monitoring signal.

12. A metal detection system comprising:
    a balanced coil system with a transmitter coil that is connected to a transmitter unit, said transmitter unit is adapted to provide transmitter signals, said signals adapted to have one of a fixed transmitter frequency and a variable transmitter frequency, and with a first receiver coil and a second receiver coil that are adapted to provide output signals to a receiver unit, the output signals adapted to compensate one another in the event that the metal detection system is in balance; and
    a modulation unit configured to be supplied with a carrier signal having the transmitter frequency and with a monitoring signal having a monitoring frequency and that is adapted to provide a modulated monitoring signal with suppressed carrier signal to a monitoring coil that is inductively coupled with at least one of the receiver coils, the receiver coils adapted to have output signals are adapted to be demodulated in a demodulation unit that is adapted to provide a demodulated monitoring signal to a signal processor, said processor configured to measure a deviation of the demodulated monitoring signal at least one of in phase and in amplitude from a reference and to provide an alarm if a measured deviation exceeds a given threshold value.

13. The metal detection system of claim 12 wherein the transmitter unit has a power amplifier having an output, which is adapted to provide the carrier signal, connected to the transmitter coil and to a first input of the modulation unit.

14. The metal detection system of claim 12 wherein a signal source having an output, which is adapted to provide the carrier signal, is connected to an input of a power amplifier and to a first input of the modulation unit.

15. The metal detection system of claim 12 wherein a reference unit is adapted to provide a reference frequency signal to a signal source and to a divider unit, which is adapted to provide the monitoring signal to a second input of the modulation unit.

16. The metal detection system of claim 12 wherein the modulation unit is one of:
- a Single Sideband Modulator adapted to provide terms for one sideband and terms for the carrier signal that are canceled, such that one sideband is adapted to be supplied to the monitoring coil; and
- a Double Sideband Modulator to provide terms for two sidebands and terms for the carrier signal that are canceled, such two sidebands are adapted to be supplied to the monitoring coil.

17. The metal detection system of claim 12 wherein the receiver coils are connected with one tail to one another and with another tail to respective tails of two identical center-tapped primary windings of a balanced transformer having two identical center-tapped secondary windings each having a tail connected to an amplifier, said amplifier being adapted to forward an amplified signal to the demodulation unit, said demodulation unit adapted to provide in-phase components and quadrature components at least of the demodulated monitoring signal.

18. The metal detection system of claim 17 wherein the amplifier is adapted to forward the amplified signal via a filter unit to the demodulation unit.

19. The metal detection system of claim 12 wherein the demodulated monitoring signal is adapted to be forwarded to an analog to digital converter, said converter adapted to provide the demodulated monitoring signal in digital form to the signal processor.

20. The metal detection system of claim 12 wherein the monitoring coil is wound around a tail of one of the receiver coils, such that measured objects are not adapted to travel through the monitoring coil.

\* \* \* \* \*